No. 797,515. PATENTED AUG. 15, 1905.
W. G. HUGHES.
METALLIC BACKED TOOTH.
APPLICATION FILED FEB. 11, 1903.

WITNESSES: INVENTOR

UNITED STATES PATENT OFFICE.

WILLIAM G. HUGHES, OF PITTSBURG, PENNSYLVANIA.

METALLIC-BACKED TOOTH.

No. 797,515.            Specification of Letters Patent.            Patented Aug. 15, 1905.

Application filed February 11, 1903. Serial No. 142,836.

*To all whom it may concern:*

Be it known that I, WILLIAM G. HUGHES, of Pittsburg, Allegheny county, Pennsylvania, have invented a new and useful Metallic-Backed Tooth, of which the following is a full, clear, and exact description, reference being had to the accompanying drawings, forming part of this specification, in which—

Figure 1:
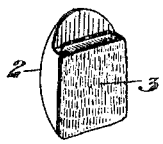
Figure 2:
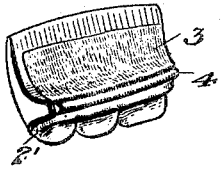
Figure 3:

Figure 1 is a perspective view of a tooth constructed in accordance with my invention. Fig. 2 is a similar view showing a block of teeth and modified form of plate; and Fig. 3 is a vertical cross-section of Fig. 2, taken on a plane passing between two teeth of the block and showing the tooth material partly in section and partly in side elevation.

The object of my invention is to provide improved means by which artificial teeth can be attached to crown bridgework, rubber plates, or other dentures.

The invention consists in an artificial tooth having on its lingual surface a backing composed of a smooth foil, sheet, or plate of metal, preferably platinum or platinum alloy, which is applied to the tooth material and secured thereto solely by baking it on at the high temperature to which the tooth is subjected in its manufacture. The silica or other material in the tooth-body under the action of the heat forms a fused enamel and acts to securely cement the metal to the tooth without the use of any anchoring projections, rivets, or other securing means. When the tooth is to be attached to bridgework, this metal backing constitutes effective means for soldering to the bridgework or for attaching to a plate of rubber or the like. When the plates of appreciable thickness are used, it may be desirable to roughen the lingual or outer surface of the plate to assist in securing or soldering the tooth to the denture; but I have found that light coatings or foils secured to the tooth-body in the manner mentioned are sufficient for most purposes and are to be preferred where low cost is essential. The platinum backing thus applied affords no space for the lodgment of food particles, as do the means usually employed heretofore, and in the process of making the tooth the distribution of heat thereto with such backing is uniform and the tooth is not apt to crack or check as when wires or anchoring projections are embedded in it to afford the means of attachment.

On account of their greater mass, pins or wires when used conduct the heat rapidly to the point of attachment and often check and cause injury to the tooth. A smooth metal backing also adds materially to the strength of the tooth, whereas embedded wires or projections tend to weaken it. Moreover, the color of the tooth is not changed during the process of securing it to the denture by heat.

In Fig. 1 of the drawings, 2 represents an artificial tooth made, as usual, of porcelain or feldspar material, and 3 is a platinum plate, sheet, or foil which is secured to the lingual surface.

In Fig. 2 I show a block of teeth 2' with similar plate 3, having a ridge or projection 4 formed thereon for attachment to the denture when used for crown or bridgework. The platinum backing is pressed on, molded on, or applied in any other preferred manner to the lingual surface of the tooth or block of teeth before baking, and when subjected to the high temperature employed in baking the platinum securely attaches itself to and forms an integral part of the tooth.

The platinum or other alloy is preferably of such a character that its coefficient of expansion and contraction is the same as or as nearly as possible like that of the tooth material.

Any suitable kind of metal support or denture may be soldered or secured to the platinum backing, or where it is of considerable thickness to adapt it to be embedded in rubber the rear surface of the platinum may be roughened to afford the required hold.

The plate may be used either on a single tooth or upon a group of teeth, known as a "block."

I claim—

1. An artificial tooth having on its lingual surface a plain metallic coating secured to said surface solely by the vitrification of the tooth material itself; substantially as described.

2. An artificial tooth having on its lingual surface a plain coating containing platinum, said coating being secured thereto solely by the vitrification of the tooth material itself; substantially as described.

3. An article of manufacture consisting of an artificial-tooth structure comprising a thin metallic plate having a facing of enamel or other similar material fused to one side thereof and adapted to be secured to a supporting dental structure.

4. An artificial-tooth structure comprising a thin metallic plate having a facing of enamel or other similar material fused to one side thereof, and a solid metallic body portion secured to the other side thereof.

In testimony whereof I have hereunto set my hand.

WILLIAM G. HUGHES.

Witnesses:
   GEO. B. BLEMING,
   H. M. CORWIN.